Feb. 22, 1927. 1,618,840
W. M. McCAY
FINNING UNIT FOR FISH DRESSING MACHINES
Filed Nov. 4, 1925

Inventor
WILLIAM M. McCAY,

By  Lacey & Lacey,  Attorneys

Patented Feb. 22, 1927.

1,618,840

UNITED STATES PATENT OFFICE.

WILLIAM M. McCAY, OF EVERETT, WASHINGTON.

FINNING UNIT FOR FISH-DRESSING MACHINES.

Application filed November 4, 1925. Serial No. 66,785.

This invention relates to improvements in fish dressing machines and more particularly to the finning blades of such a machine, and one of the objects of the invention is to provide a finning blade which may be readily substituted for the finning blades now in common use on such machines without any alteration of the machine construction and which will operate more effectually in cleanly severing the fish tail, and the throat, belly, and dorsal fins from the body of the fish as fed through the machine.

In one type of fish dressing machine now in common use, each finning unit comprises a pair of circular cup-shaped blades mounted upon spindles and formed with outwardly flared cutting rims rotatably fitting one within the other, the blades being rotated in opposite directions. This construction, however, results in considerable friction and wear inasmuch as oil cannot be used as a lubricant. In another type of dressing machine, the finning unit comprises a rotary saw blade and a circular blade having a peripheral kerf or groove therein in which the toothed periphery of the saw blade operates, but this construction presents the disadvantage that two blades are required to be employed and this is likewise true of the first type of machine mentioned above. Therefore, it is another object of the invention to so construct the blade of the present invention as to overcome these disadvantages and render it necessary to use only one of said blades which, by reason of its peculiar novel construction, is better enabled to cleanly sever the fins than are the blades of the old types mentioned.

Another object of the invention is to provide a finning unit for a fish dressing machine comprising a rotating blade having a toothed periphery of a character to make a clean cut, in the operation of severing the fins, in combination with means for limiting the cut of the blade in such manner as to obviate the cutting away of a considerable portion of the flesh of the fish during the finning operation, as is liable to frequently occur in the use of the blades of the old types.

Another object of the invention is to materially simplify the construction of finning blades for fish dressing machines and so construct the blade that it may be readily and quickly dismounted from its spindle whenever it becomes necessary to replace or resharpen the blade.

Figure 1:
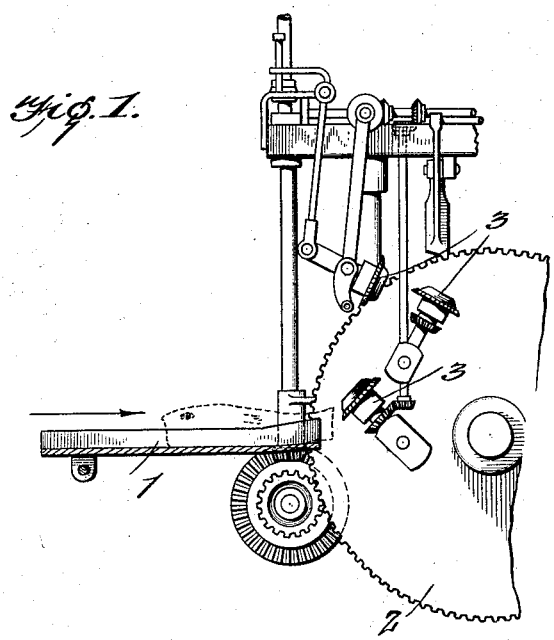
Figure 1 is a view in elevation, illustrating so much of a fish dressing machine as is necessary to an understanding of the present invention.

Figure 1 of the drawings illustrates so much of the mechanism of a fish dressing machine of a well known type, as is necessary to an understanding of the nature of the present invention and, in this figure, the numeral 1 indicates in general the bed plate over which the fish body is moved after being beheaded, and the numeral 2 indicates the usual carrier by which the body is taken up from the bed plate. The numeral 3 indicates in general the several finning units which are necessary to act upon the fish body as it is carried around by the carrier 2, to remove therefrom the fish tail, and the throat, belly, and back or dorsal fins. These units in themselves are arranged and actuated in the ordinary manner and each embodies a spindle which is indicated by the numeral 4 and which has an enlarged portion 5 rotatably mounted in a bearing 6 in the head of the unit, a beveled pinion 7 being keyed or otherwise secured upon the spindle 4 at one side of the bearing whereby rotary motion may be imparted to the spindle, and the portion 5 of the spindle, at its opposite end, being reduced so as to provide a cylindrical, axially located centering stud or element 8.

The blade of the finning unit is indicated in general by the numeral 9 and the said blade has one of its faces, indicated by the numeral 10, flat, and its opposite face, indicated by the numeral 11, likewise flat except at its periphery, where it is beveled in the direction of the first mentioned face of the blade, as indicated by the numeral 12. The blade is formed at its beveled periphery with a plurality of teeth which are indicated by the numeral 13, and these teeth are thinned in the direction of their outer ends because of the bevel given the periphery of the blade 9 and, therefore, the teeth have sharpened outer edges 14 which are of an appreciable length and, due to the peculiar form given the teeth, they are adapted to sever the fins from the body with a clean cut and without tearing the flesh or cutting into the same in a manner to remove any appreciable portion thereof.

Figures 2, 3:
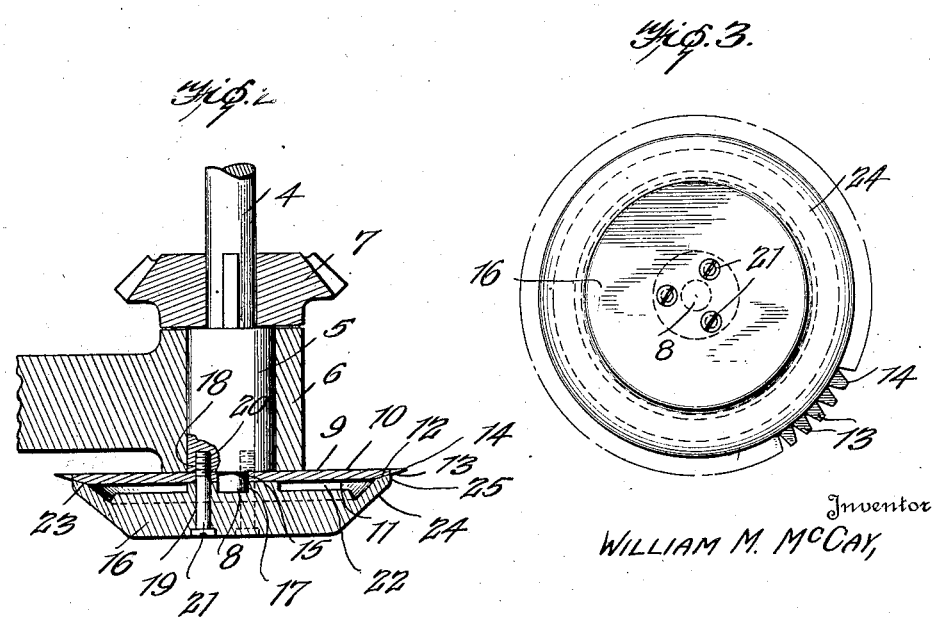
Figure 2 is a detail vertical sectional view taken axially through one of the finning units embodying the invention.
Figure 3 is a bottom plan view of the finning unit shown in Figure 2.

The blade 9 is formed centrally with an opening 15 which receives the centering stud 8 so that the blade is centered with respect to the spindle 4, and a guard member, indicated in general by the numeral 16, is disposed against the outer face 11 of the blade and the said guard is formed centrally in its face which is disposed against the face of the blade 9, with a cylindrical socket 17 accommodating the end of the stud 8, it being understood that in this manner the blade and guard are centered with relation to the spindle 4. Registering openings 18 and 19 are formed in the blade and guard respectively, and threaded sockets 20 are formed in the end of the enlargement 5 of the spindle from which the stud 8 projects, securing screws 21 being fitted through the said openings and threaded into the sockets 20 with their heads flush with the outer surface of the guard, so as to secure the parts together in their properly assembled relation. The said face of the guard which is disposed next to the blade 9 is formed with an annular recess 22 which confronts the outer face 11 of the blade and it will be observed by reference to Figure 2 of the drawings that the periphery of the guard at its said face is beveled, as indicated by the numeral 23, so that an annular bearing surface is provided which rests firmly against the beveled periphery 12 of the blade, immediately inwardly of the teeth 13. It will also be observed by reference to this figure that the guard, while relatively shallow, is of substantially frusto-conical form so that it has an inclined or conical periphery indicated by the numeral 24, the guard, however, at its said periphery, being formed with an abrupt annular shoulder 25 which defines the outer margin of the beveled surface 23 of the guard and substantially registers with the inner ends of the teeth 13. It will be observed that the slope of the peripheral surface 24 of the guard is such, together with the depth of the shoulder 25, that a line extended along and beyond the said peripheral surface 24 would touch the outer sharpened edges or ends 14 of the cutting teeth 13. It will now be evident that the guard serves effectually as a means for preventing the toothed periphery of the blade 9 cutting into the body of the fish during the fin severing operation and that, therefore, there is no waste of meat. It will likewise be evident that the blade is firmly supported at its periphery and that the teeth of the blade are not sharply pointed but have sharpened outer edges of an appreciable length so that they cut through the base of the fin and have no tendency whatsoever to merely tear through the fin, as is the case in blades having sharply pointed teeth.

Having thus described the invention, what I claim is:

1. A rotary cutter comprising a circular blade having the peripheral marginal portion of one of its faces beveled to provide a cutting edge, and a circular guard secured against the side of the blade having its peripheral portion beveled to rotate therewith, and terminating adjacent the cutting edge of the blade in an abrupt stop shoulder, and having the peripheral portion adjacent the stop shoulder beveled.

2. A rotary cutter comprising a circular blade having the peripheral marginal portion of one of its faces beveled to provide a cutting edge, and a circular guard secured against the side of the blade having its peripheral portion beveled to rotate therewith, and having the edge in contact with the blade beveled to match the beveled edge thereof, and terminating in an abrupt stop shoulder adjacent the cutting edge of the blade, and having the peripheral portion beveled.

3. A rotary cutter comprising a circular blade having its peripheral marginal portion beveled to a cutting edge, and having the beveled edge indented to provide teeth which terminate in cutting edges having an appreciable circumferential extent and whose sides similarly incline.

4. A rotary cutter comprising a spindle, a circular blade secured to an end of the spindle and having teeth at its outer edge and a marginal portion of a face beveled to provide circumferential cutting edges to the teeth, a circular guard secured to the spindle and to the side of the blade having its outer portion beveled, said guard having an abrupt stop shoulder at the inner ends of said teeth and having a peripheral portion beveled.

5. A finning unit for fish dressing machines comprising a spindle, a circular finning blade mounted thereon and having a toothed periphery, and a circular guard fixed with relation to one face of the blade and having its periphery concentric to the series of teeth and located close thereto, the said guard having its peripheral portion beveled for a portion of the thickness of the guard and having its said periphery straight for the remaining portion of the thickness whereby to provide a shoulder presented substantially at the inner ends of the teeth.

6. A finning unit for fish dressing machines comprising a spindle having an enlargement and a centering stud projecting from one end of the enlargement, a finning blade disposed against the said end of the enlargement of the spindle and having an opening accommodating the said stud, a circular guard disposed against the outer face of the said blade and having a socket accommodating the end portion of the centering stud, and fastening elements fitted through the guard and blade and secured in the said end of the enlargement of the spindle.

In testimony whereof I affix my signature.

WILLIAM M. McCAY. [L. S.]